United States Patent [19]

Goldman et al.

[11] Patent Number: 4,713,173

[45] Date of Patent: Dec. 15, 1987

[54] THREE ELEMENT AQUARIUM FILTER CARTRIDGE

[75] Inventors: Jerome Goldman, New York; Marvin Goldman, Great Neck; Terry Goldman, New York, all of N.Y.

[73] Assignee: Penn Plax Plastics, Inc., Garden City, N.Y.

[21] Appl. No.: 816,084

[22] Filed: Jan. 3, 1986

[51] Int. Cl.[4] .................... B01D 27/02; B01D 35/16
[52] U.S. Cl. .................... 210/169; 210/315; 210/489; 210/496; 119/5
[58] Field of Search ............ 119/5; 210/169, 416.2, 210/314, 315, 483, 488, 489, 496, 501, 503, 505

[56] References Cited

U.S. PATENT DOCUMENTS

| | | | |
|---|---|---|---|
| 3,313,421 | 4/1967 | Falkenberg et al. | 210/169 |
| 3,327,859 | 6/1967 | Pall | 210/503 |
| 3,347,211 | 10/1967 | Falkenberg et al. | 210/169 |
| 3,867,292 | 2/1975 | Cornell | 210/169 |
| 3,899,424 | 8/1975 | Lake | 210/169 |
| 3,983,843 | 10/1976 | Johnson | 210/169 |
| 4,265,751 | 5/1981 | Willinger | 210/416.2 |
| 4,483,769 | 11/1984 | Sherman | 210/282 |

Primary Examiner—Richard V. Fisher
Assistant Examiner—Wanda L. Millard
Attorney, Agent, or Firm—R. Scott Goldman

[57] ABSTRACT

A filter cartridge for use in aquarium filtration systems having mechanical, chemical and biological filtration elements. The mechanical element forms the front wall of the filter cartridge and this is bonded around the outer border thereof to a back member. The back member may be rigid or semi-rigid.

17 Claims, 5 Drawing Figures

U.S. Patent   Dec. 15, 1987   Sheet 1 of 1   4,713,173
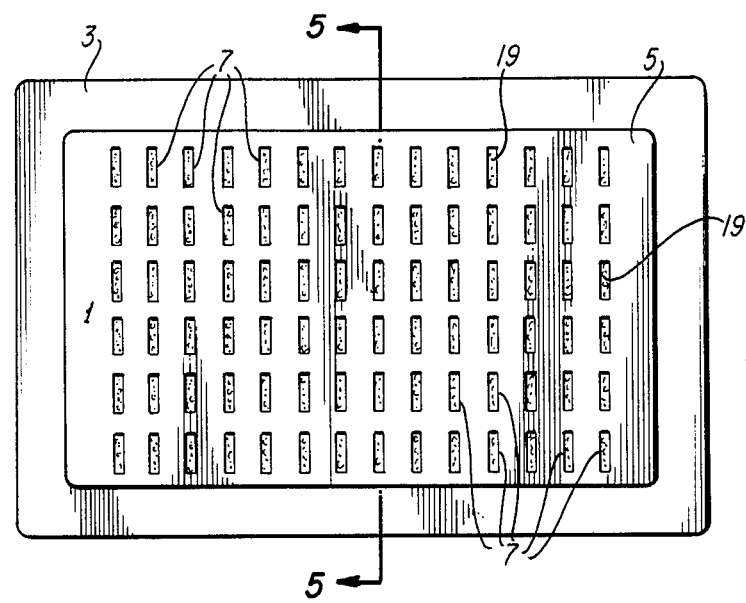
FIG. 1
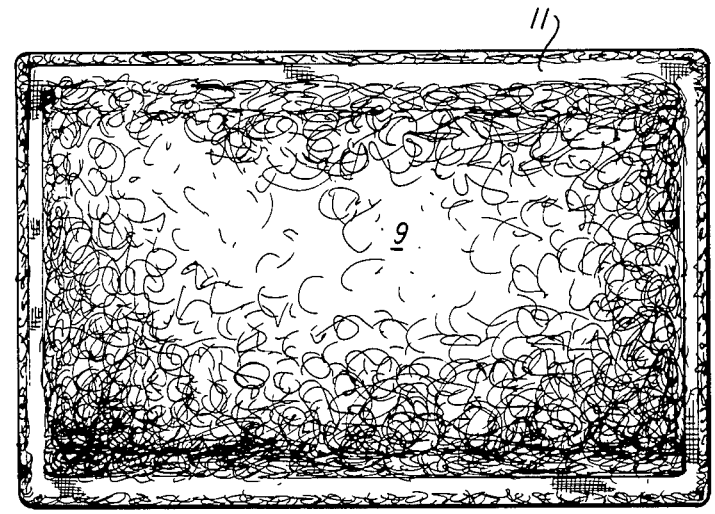
FIG. 2
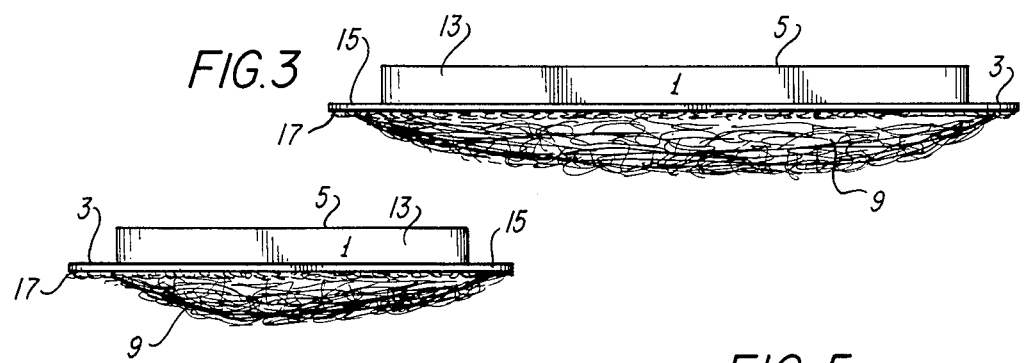
FIG. 3
FIG. 4
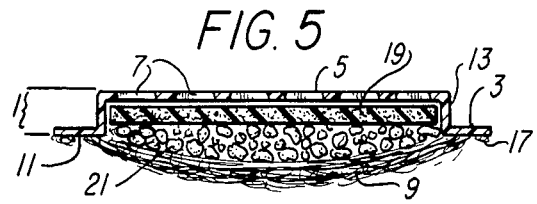
FIG. 5

THREE ELEMENT AQUARIUM FILTER CARTRIDGE

BACKGROUND OF THE INVENTION

The present invention relates to a filter cartridge for use in aquarium filtration systems. More particularly, this invention relates to a filter cartridge for use in aquarium filtration systems which combines mechanical, biological, and chemical filtration in a single filter cartridge unit. The filter cartridge can have a rigid or semi-rigid back wall.

The present invention finds use as the cleaning or filtering element in various types of aquarium filtration systems. These systems are used to remove different types of debris material from the water of an aquarium used to house fish or other like inhabitants. The present invention is suited for use in the general upkeep of the aquarium by the home hobbyist, by the researcher in a laboratory setting, in pet store aquarium systems, or in similar aquarium uses.

A water filtering system is an essential component in order to maintain fish in an aquarium setting. Filtering is conventionally accomplished by forcing water into the body cavity of a filter unit. The filter cavity is filled with a filtering material which entraps and/or neutralizes the chemical wastes, debris and other particulate matter commonly found in the fish tank water. The water, once cleansed, is allowed to re-enter the main body of the aquarium. Conventional filter units used in the aquarium art include filter systems which are positioned within the aquarium, often in the corner of the fish tank. Additionally a variety of filter systems are known in the art which position the filter cavity outside of the aquarium and clean the aquarium water on the outside of the tank. The inventive filter cartridge of the present application may be adapted for use in either type of filter system or any filter system which requires or allows use of a cartridge type filtering element.

Filtering material generally used in aquarium filtration systems consist of two components. There is usually a coarse granular material, such as charcoal, or activated carbon which is suitable for chemical absorption of fish tank waste. Also, commonly used in combination with the coarse granular material is the mechanical type filtration element. This element is usually a floss type material such as glass wool, or polyester floss, having large interstices which can trap large aquarium debris. In conventional aquarium filtration these filtering elements while used in combination are introduced to the filter cavity in a separate manner. When these materials are wet and dirty with fish tank debris they are difficult to handle without causing a great mess. Particularly, the coarse material sticks to the walls of the filter cavity and is difficult to remove. This causes a great drawback when the filtering material must be replaced with clean material.

To remedy the above-noted drawback it has been known in the art to form a cartridge unit for aquarium filtration with the coarse filtering material on the inside of a pouch or pocket formed from out side walls of floss material. In such cartridge units the outer edge of the floss material side walls of the cartridge are sealed in some manner, such as heat sealing or glue, in order to keep the coarse granular filter material inside the floss material pocket. Often the mended outer edge is provided with a certain degree of rigidness. This facilitates the placement of the filter cartridge into the filter cavity. Often channels are provided in the cavity of a filter for insertion of the filter cartridge. A semi-rigid edge on the cartridge facilitates such placement. The filter cartridge is formed to fit the filter cavity of various types of filters available in the market in such a manner so that the filter cartridge may be placed into the filter cavity to perform a filter function by having all the aquarium water moving through the filter pass through the filter cartridge. Also the filter cartridge should be formed so that it may easily be removed from the filter cavity so that it can be replaced with a clean cartridge.

A third type of filtering element also known in the art is recognized as a biological filter. Such filter elements are generally in the form of a foam or sponge-like material, of small pore size. Unicellular and other microorganisms such as rotifers thrive in the pores of the sponge-like filter material and feed on aquarium debris which is trapped within these pores. This provides an efficient means of cleaning various types of aquarium wastes in a biological fashion. Filter cartridges have recently appeared in the art wherein a mechanical floss type material is directly bonded to a sponge type biological filter material with coarse filtering material placed in the middle. This type of filter cartridge offers a combination of the three types of filtering material. However, due to inferior bonding between the front and back walls problems arise with keeping the coarse material from falling out of the cartridge.

SUMMARY OF THE INVENTION

The aquarium filter cartridge of the present invention combines all three types of aquarium filtering material, chemical, mechanical, and biological, into a single, and convenient cartridge unit. This allows for triple filtration of aquarium water simultaneously in the same filter unit utilizing the same cartridge. The present filter cartridge is provided with a front wall made from a material which can function as a mechanical filter component in aquarium use. The back wall of the filter cartridge can be made from the same material as the front wall, or can be produced from a rigid or semi-rigid material which may be effectively and efficiently bonded to the mechanical filter element. Further, layers of chemical filtration material and biological filtration material are positioned between the front and back walls of the filter cartridge. The filter cartridge is formed into a size and shape so that it fits with the filter cavity of a filtration unit. Therefore, water passing through the filter cavity of the filtration unit passes through and contacts all three elements of the filter cartridge unit.

Filter cartridges of the present invention can be produced by forming both a front and back wall of the cartridge from a compatible mechanical filter material if sufficient bonding strength could be achieved. The coarse filtration material and sponge-like biological filtration material can be placed between these outer walls. Generally, such a cartridge should be provided with a flexibly rigid frame around the outer edge to facilitate use in a filtration unit. Also, as indicated above, filter cartridges have recently appeared in the art wherein a mechanical floss type material is directly bonded to a sponge type biological filter material with coarse filtering material placed in the middle. Such an arrangement results in inferior bond strength and an unsuitable filter cartridge which often leaks the coarse material. Also, the biological filter material is often not of sufficient strength in order to avoid rips and tears caused by the coarse filtering material contained therein.

The inventors have found that by forming the back wall of the filter cartridge from a semi-rigid material such as plastic and providing slits or holes in this material, use of the filter cartridge in various types of filtration units is greatly facilitated. The hard back or semi-rigid back provides greater ease in placement and removal of the filter cartridge from a filter unit. Also, the inventors have found that the semi-rigid or hard back wall allows for a better bond between the front and back wall, even when compared to cartridges with floss material on both sides. This aids in maintaining the chemical and biological filtration material within the filter cartridge while not reducing mechanical filtration effectivness since the majority of mechanical filtration performed by the floss material is accomplished when the water enters the cartridge and not when it exists.

It is an object of the present invention to provide a filter cartridge for use in aquarium filtration systems which combines mechanical, chemical and biological filtration elements.

It is a further object of the present invention to provide a three element filter cartridge which is adapted for easy and convenient placement and removal in the filter cavity of various types of aquarium filtration systems.

It is another object of the present invention to provide a three element filter cartridge which maintains sufficient bond strength between the front and back wall of the cartridge to retain chemical and biological filter elements within the walls of the filter cartridge.

The present invention is a filter cartridge for use in an aquarium filtering system to remove debris and other particulate matter and aquarium wastes from the aquarium water. It functions in an aquarium filtration system which draws water from the aquarium through a filter cavity into which the filter cartridge is placed. The water passing through the filter cavity is directed through the filter cartridge passing through all the chemical, mechanical and biological filtering elements before re-entering the aquarium.

The mechanical filtering material forming at least the front outer wall of the present filter cartridge may be a material such as dacron, felt, filter floss, paper, or other materials which meet the following requirements. This filter element must be inert and suitable for prolonged exposure to aquarium water. The material must have sufficient porosity to allow water to freely pass through the material, and contain numerous and relatively large spaces within the material in order to entrap large particulate matter from the aquarium water. It also must be capable of being formed into a sheet structure which may bond to itself or other suitable back wall materials. Generally the mechanical filter is a fibrous material since it provides suitable porosity to trap particles while allowing water passage. Dacron sheets are preferable for this purpose.

The chemical filtering material suitable for the present invention may be materials such as charcoal, carbon, activated carbon, or filtering resins. Such material must be capable of absorbing and maintaining chemical wastes within the filtering material. Activated carbon is a preferable material for use in the present invention due to its enhanced filtering properties and general acceptance in the aquarium art. Additionally, other chemical filtration materials such as zeolite may be used alone or in combination with carbon material for increased effectiveness in aquarium maintenance.

The biological filtering material used in the present invention may be a natural or synthetic sponge or foam type material or any other material providing suitable internal spaces and proper living conditions for enhancing the growth and maintenance of microorganisms such as rotifers. Since the environmental conditions in the usual aquarium system provide good living conditions for growth of these micro-oranisms, the key feature of the biological filtering material is that it provides space for the micro-organisms to grow and multiply, and entraps an abundant source of food for the micro-oranisms to eat, fish tank wastes. The material must be inert and capable of withstanding prolonged exposure to aquarium water. Water must readily pass through the material so the porosity of the biological filter material must be sufficient to allow the passage of water, while retaining fish tank waste material. It also should be capable of being formed into sheet type structures for placement within the filter cartridge interior.

The back wall of the filter cartridge may be formed from a material used to form the mechanical filtering element. However, since the large debris in the water passing through the filter cartridge will be trapped in the mechanical filter element, as well as the chemical and biological filtration layers, filtering efficiency is generally not increased by the use of mechanical filtering material as the back wall of the filter cartridge. The inventors have found that a rigid or semi-rigid material such as plastics, rubbers, metallic foils, compressed fibers or other semi-rigid natural or synthetic sheet materials are preferable for use as the back wall of the filter cartridge. Plastic materials such as polypropylene are most preferable for use. These materials must be capable of providing a secure bond around the outer edge of the filter cartridge to the mechanical filtering material which forms the front wall of the filter cartridge. This bonded area forms a frame-like border around the filter cartridge. Further, the semi-rigid back wall of the filter cartridge must be provided with a plurality of openings such as slit-like or hole-like openings in order to allow the passage of water therethrough. The openings should not be formed in the frame-like border area since it is undesirable to have water pass through this portion of the filter cartridge since the chemical and biological components may be bypassed. Further, in a preferred embodiment of the present invention a recess is formed in the back wall so that the sheet of biological filtration material may be positioned in the recess. This allows for greater ease for removal and placement of the filter cartridge into a filtration unit.

In order to form the filtration unit of the present invention it is generally preferable if the mechanical filtering element front wall and the back wall material of the filter cartridge are cut to a predetermined size which corresponds to the size of the filter cavity for which the cartridge is intended for use. Such cutting will usually be performed in a diecut manner to facilitate cutting on a commercial scale. Generally, the cartridge will be cut to a front surface size within the range of 2 to 15 inches in both width and length since this will accommodate most aquarium filtration units.

The biological filter material which will usually be in the form of a sheet will also be precut for placement within the filtered cartridge. The size of this material must be smaller than the size of the front and back wall material so that the biological material does not interfere with the joining of the outer walls. Also, if the back wall is formed with a recess for the placement of the biological filter material the material should be precut in order to fit into the recess.

A predetermined amount of coarse chemical filtering material is added so that the filter cartridge is not overstuffed with the coarse material, but a full layer of the material may be formed. Exact amounts will vary with the size of the filter cartridge, but there should be a sufficient quantity to provide chemical filtration for aquariums with from 10 to 100 gallons of water, depending upon the size of the filter cartridge. Also, if too much chemical filtration material is added the cartridge will be overstuffed, increasing the liklihood of tearing and adversely affecting the ease of placement and removal of the cartridge into the cavity of a filter unit.

The elements of the filtered cartridge will then be layered in a manner so that the mechanical filtration element forms the front wall. This is followed by a layer of course granular chemical filtration material, which is in turn followed by the sheet formed of biological filtration material and the back wall material of the filtered cartridge. The order of the chemical and biological filter material may be reversed without adversely affecting the filter cartridge. The front and back wall of the filter cartridge are then sealed around the outer edge to form a pocket or pouch filled with the chemical and biological filtration elements. Bonding may be performed in any suitable manner such as the use of a water resistant glue or adhesive, or through a thermal bonding or heat sealing. Bonding may also be preferably performed using a radio frequency (rf) sealer, an ultrasonic sealer, a dieltric sealer or an impulse sealer.

BRIEF DESCRIPTION OF THE DRAWINGS

The above and other objects of and advantages of the present invention will become readily apparent by reference to the following description when considered in conjunction with the accompanying drawings, wherein:

FIG. 1 is a back view of the preferred embodiment of the present invention showing the semi-rigid back material preferably used in the present invention.

FIG. 2 is a front view of the preferred embodiment of the present filter cartridge wherein the front outer wall of the filter cartridge is depicted as a mechanical filtration element in the form of a fibrous material.

FIG. 3 shows a side view of the preferred embodiment of the present filtered cartridge. The front and back walls are illustrated as viewed from one side of the cartridge.

FIG. 4, similar to FIG. 3 shows a side view of the preferred embodiment of the present invention, illustrated from a different axis. The front and back walls of the cartridge are illustrated.

FIG. 5 is a sectional view of the presently claimed filter cartridge showing a cross section of the filter cartridge.

Each component of the filter cartridge is illustrated in this figure.

Like references refer like parts throughout the several views of the drawings.

DETAILED DESCRIPTION OF THE PREFFERED EMBODIMENT

FIG. 1 illustrates a back view of a preferred embodiment of the present filter cartridge. The semi-rigid hard back of the preferred embodiment is designated as 1. A flat frame like border 3 is formed on the outer edge of the filter cartridge back component. A central recessed section 5 is formed within the outer framed border 3. A plurality of slit-like openings 7 are formed in the central recessed portion 5 of the back member 1 of the filter cartridge. These slit-like openings 7 allow the free passage of water therethrough. Slit-like openings 7 are not formed in the frame-like border 3 of the back member 1 since it is undesirable to have water pass through this portion of the filter since such water may bypass the chemical and biological filter elements. The biological filter element 19 may be seen through the slit-like openings 7.

FIG. 2 shows the front of a preferred embodiment of the present filter cartridge wherein a fibrous material mechanical filtration element is used as the front outer wall 9. The bonding area 11 wherein the front wall 9 and back semi-rigid wall 1 are joined is illustrated as a flattened border surrounding the perimeter of the filter cartridge. This flattened border 11 corresponds to the frame-like boarder 3 formed on the semi-rigid back component 1.

FIGS. 3 and 4 show a side view of the preferred embodiment of the present invention. The side view illustrates both the front wall 9 and back wall 1 of the filter cartridge. The upper surface illustrated in FIG. 3 is the flat central recessed portion 5 of the back wall 1. This recessed portion protrudes above the frame-like border 3 of the back wall 1. The side wall of the recessed portion 13 of the semi-rigid back component 1 illustrates a suitable amount of recess for the recessed portion in relation to the size of the filter cartridge. Also illustrated is the side portion 15 of the semi-rigid back member 1. This shows the thickness of the semi-rigid component 1 and the point of attachment or bonding 17 of the semi-rigid back component 1 to the front component 9.

FIG. 5 illustrates a sectional view of the preferred embodiment of the present invention. The filter cartridge is cut along the width of the cartridge at a central point. The back component 1 and front component 9 are illustrated in cross section and the centrally located recessed portion of the back component which is formed by side wall 13 and top wall 5 is clearly illustrated protruding from the frame-like border 3. Also illustrated is a cross section of the biological filtration material 19, in the form of a foam and granular coarse chemical filtration material 21. The flat bonded portion 11 and point of attachment 17 ais also illustrated.

It is readily apparent that the above described aquariumm filter cartridge meets all of the objectives mentioned as well as providing other advantages for the maintenance of an aquarium fish tank. It should be understood that the specific form of the invention here and above described is intended to be representative only, as certain modifications within the scope of these teachings will be apparent to those skilled in the art of aquarium filtration and maintenance systems.

Accordingly, reference should be made to the following claims to determine the full scope of the invention.

What is claimed:
1. A filter cartridge for aquarium using comprising:
   (a) a mechanical filtration element forming a front wall of the filter cartridge;
   (b) a back member which is able to let water pass therethrough, forming a back wall of the filter cartridge, the mechanical element and back mem- ber sealed to each other around the outer borders thereof;

(c) a chemical filtration element sandwiched between the front wall mechanical filter element end back member, and;

(d) a biological filtration element which is formed from a material selected from the following group consisting of natural sponge, synthetic sponge, and foam, also sandwiched between the front wall mechanical filtration element and the back member, the back member of the filter cartridge being a distinct component from the biological filtration element.

2. The filter cartridge of claim 1, wherein the back member is formed from a rigid material which has openings formed therein to allow the passage of water.

3. The filter cartridge of claim 2 wherein the chemical filtration member is formed from coarse granules of at least one member selected from the group consisting of charcoal, carbon, activated carbon, filtering resins, and zeolite.

4. The filter cartridge of claim 3, wherein the biological filter element is in the form of a sheet.

5. The filter cartridge of claim 2, further comprising a recessed portion centrally located in the back member, for the placement of the biological filtration element, and the openings formed in the back member being present only in the recessed area.

6. The filter cartridge of claim 2 wherein the mechanical filtration element is a sheet made from one material choosen from the group consisting of dacron, felt, filter floss, and paper.

7. The filter cartridge of claim 1, wherein the back member is formed from a semi-rigid material which has openings formed therein to allow the passage of water.

8. The filter cartridge of claim 7, further comprising a recessed portion centrally located in the back member, for the placement of the biological filtration element, and the openings formed in the back member being present only in the recessed area.

9. The filter cartridge of claim 7 wherein the mechanical filtration element is a sheet made from one material choosen from the group consisting of dacron, felt, filter floss, and paper.

10. The filter cartridge of claim 7 wherein the chemical filtration member is formed from coarse granules of at least one member selected from the group consisting of charcoal, carbon, activated carbon, filtering resins, and zeolite.

11. The filter cartridge of claim 7, wherein the biological filter element is in the form of a sheet.

12. The filter cartridge of claim 7 wherein the back member is made of plastic.

13. The filter cartridge of claim 1 wherein the mechanical filtration element is a sheet made from one material choosen from the group consisting of dacron, felt, filter floss, and paper.

14. The filter cartridge of claim 1 wherein the chemical filtration member is formed from coarse granules of at least one member selected from the group consisting of charcoal, carbon, activated carbon, filtering resins, and zeolite.

15. The filter cartridge of claim 1, wherein the biological filter element is in the form of a sheet.

16. The filter cartridge of claim 1 wherein the front and back walls are sealed using an adhesive sealer.

17. The filter cartridge of claim 1 wherein the front and back walls are sealed using a radio frequency sealer, a dielectric sealer, an ultrasonic sealer, or an impulse sealer.

* * * * *